United States Patent
Suzuki et al.

(10) Patent No.: US 8,184,306 B2
(45) Date of Patent: May 22, 2012

(54) OPERATE LIGHT SOURCE OF READING UNIT OF A MULTIFUNCTION PERIPHERAL DEVICE ACCORDING TO VALID INSTRUCTIVE KEYS

(75) Inventors: Nobuhiko Suzuki, Aichi (JP); Hiroko Ishikawa, Aichi (JP); Hirotsugu Takahata, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 918 days.

(21) Appl. No.: 12/175,145

(22) Filed: Jul. 17, 2008

(65) Prior Publication Data
US 2009/0021761 A1 Jan. 22, 2009

(30) Foreign Application Priority Data
Jul. 20, 2007 (JP) .................. 2007-189346

(51) Int. Cl.
G06F 3/12 (2006.01)
H04N 1/00 (2006.01)
H04N 1/46 (2006.01)
G03G 15/04 (2006.01)

(52) U.S. Cl. ......... 358/1.13; 358/434; 358/509; 399/32; 399/220

(58) Field of Classification Search .................... None
See application file for complete search history.

(56) References Cited

U.S. PATENT DOCUMENTS

| 6,765,696 B1 * | 7/2004 | Motominami et al. | ....... 358/471 |
| 7,260,730 B2 | 8/2007 | Sakaue | |
| 2002/0171819 A1 * | 11/2002 | Cheung | ......... 355/133 |
| 2004/0130732 A1 * | 7/2004 | Denpo | ......... 358/1.1 |

FOREIGN PATENT DOCUMENTS

| JP | 8-001370 | | 9/1996 |
| JP | 08-001370 U | | 9/1996 |
| JP | 11-184345 | | 7/1999 |
| JP | 2001-166398 | A | 6/2001 |
| JP | 2003-078712 | A | 3/2003 |
| JP | 2004-166257 | | 6/2004 |
| JP | 2006-140644 | A | 6/2006 |
| JP | 2006-217075 | | 8/2006 |
| JP | 2006-333059 | | 12/2006 |
| JP | 2007-125801 | A | 5/2007 |

OTHER PUBLICATIONS

JP62238550-abstract.*
JP Office Action dtd Mar. 13, 2012, JP Appln. No. 2007-189351, English translation.

* cited by examiner

Primary Examiner — Benny Tieu
Assistant Examiner — Fan Zhang
(74) Attorney, Agent, or Firm — Banner & Witcoff, Ltd.

(57) ABSTRACT

A multifunction peripheral device capable of being operated in a plurality of switchable operational modes is provided. The multifunction peripheral device includes a reader unit with a light source and a light receiving element to receive the light reflected on the original document to generate image data, operation receiving members, through which a user's instructions are entered, a valid instruction storage unit to store valid instruction information, which defines correspondence between a valid instruction and a valid instruction receiving member, a judging unit to judge as to whether an operation entered through one of the operation receiving members is the valid instruction based on the valid instruction information and a current operational mode, and a switching unit to switch the light source on when the judging unit judges that the entered operation is the valid instruction.

14 Claims, 6 Drawing Sheets

| MODE | SCREEN DISPLAY | KEY CORRESPONDING TO VALID INSTRUCTION INFORMATION | USAGE DESCRIPTION |
|---|---|---|---|
| FACSIMILE MODE | FACSIMILE READY SCREEN | NUMERICAL KEYS 0-9, *, # | ENTER INTENDED RECEIVER DEVICE |
| | | SINGLE-TOUCH DIALING KEYS | SELECT INTENDED RECEIVER DEVICE |
| | | SEARCH/DIAL KEY | SELECT INTENDED RECEIVER DEVICE |
| | | REDIAL KEY | SELECT INTENDED RECEIVER DEVICE |
| | | RESOLUTION KEY | SELECT RESOLUTION OF FACSIMILE IMAGE |
| | | DUPLEX READ KEY | READ BOTH SIDES OF ORIGINAL DOCUMENT |
| | | SCAN MODE SWITCH KEY | SWITCH FROM FACSIMILE MODE READY STATE TO SCANNER MODE |
| | | COPIER MODE SWITCH KEY | SWITCH FROM FACSIMILE MODE READY STATE TO COPIER MODE |
| SCANNER MODE | SCANNER READY SCREEN | DIRECTION (UP AND DOWN) KEYS | SELECT SCANNING FUNCTION |
| | | COPIER MODE SWITCH KEY | SWITCH FROM SCANNER MODE READY STATE TO COPIER MODE |
| COPIER MODE | COPIER READY SCREEN | DIRECTION (UP AND DOWN) KEYS | SELECT SETTING ITEMS OF COPIER |
| | | DUPLEX READ KEY | READ BOTH SIDES OF ORIGINAL DOCUMENT |
| | | CONTRAST/QUALITY KEY | SELECT COPY QUALITY |
| | | ZOOM KEY | SELECT SCALE FACTOR OF COPIES IMAGE |
| | | TRAY SELECT KEY | SELECT SHEET TRAY |
| | | SORT KEY | SELECT SORTED COPIES |
| | | MULTI-PAGE PRINT KEY | ARRANGE MULTIPLE PAGES INTO 1 PAGE |
| | | NUMERICAL KEYS 0-9, *, # | ENTER A NUMBER OF COPIES TO BE MADE |
| | | START KEY | INSTRUCT TO START COPYING |
| | | SCANNER MODE SWITCH KEY | SWITCH FROM COPIER MODE READY STATE TO SCANNER MODE |

FIG. 5

OPERATE LIGHT SOURCE OF READING UNIT OF A MULTIFUNCTION PERIPHERAL DEVICE ACCORDING TO VALID INSTRUCTIVE KEYS

CROSS REFERENCE TO RELATED APPLICATION

This application claims priority from Japanese Patent Application No. 2007-189346, filed on Jul. 20, 2007, the entire subject matter of which is incorporated herein by reference.

BACKGROUND

1. Technical Field

An aspect of the present invention relates to a multifunction peripheral device having a lighting unit, which can be switched on in advance for a reading operation performed by a reader unit.

2. Related Art

Conventionally, a multifunction peripheral device having a plurality of functional units, such as a reader unit to read an image formed on an original document and a printing unit to form an image on a recording sheet, is known. The plurality of functions of the multifunction peripheral device can be achieved in several switchable operational modes, such as a facsimile mode, a copier mode, and a scanner mode. In such a multifunction peripheral device, the reader unit is configured to have a light source to emit light onto an original document so that the light reflected on the original document is received by CCDs (charge-coupled devices), which are aligned in lines in a main scanning direction, and converted into voltage values according to intensities of the reflected light. The voltage values are further converted into digital data, which thus represents the image on the original document. A fluorescent lamp such as a cold-cathode tube lamp, which emits lights in a wider range, may preferably be used for the light source in the reader unit.

When a device having the reader unit as described above is designed and used, reduction of electric power consumption is considered to be significant. Specifically, the light source of the reader unit can consume a large amount of electric power; therefore, a total amount of electric power consumption can be largely reduced if the light is switched off when the reader unit is not in use and switched on when the reader unit is operated to scan the original document.

In consideration of the electronic power consumption in the reader unit, for example, a copier in which power supply to the reader unit is cut off when the copier is not in use while power supply to the reader unit thereof is switched on when the original document being placed in a reading position is detected, is disclosed in Japanese Patent Provisional Publication No. 2006-217075.

SUMMARY

For the copier in the above-referenced publication, however, considerable time is required until the lamp, specifically the fluorescent lamp, is stabled to emit substantial amount of light for the reading operation. Therefore, according to the configuration of the reader unit in the above-referenced publication, in which the reader unit is powered on when the original document is placed therein, a user is required to wait for the considerable time period until the light amount is stabled.

In the copier in the above-referenced publication, in addition, the lamp in the reader unit can be powered on each time the user operates a key of the copier regardless of the user's intention to operate the reader unit, and the electricity can be wasted.

In view of the above drawbacks, the present invention is advantageous in that a multifunction peripheral device capable of being operated with reduced power supply is provided. Further, the multifunction peripheral device according to the present invention can switch the light source on when a preceding event, by which initiation of the reading operation can be predicted, occurs so that the user should be kept standing by for a shorter period of time until the reading operation starts.

According to an aspect of the present invention, a multifunction peripheral device having a plurality of operational functions and capable of being operated in one of a plurality of switchable operational modes, which correspond to the operational functions respectively, is provided. The multifunction peripheral device includes a reader unit including a light source to emit light onto an original document and a light receiving element to receive the light reflected on the original document to generate image data which corresponds to an image formed on the original document, a plurality of operation receiving members, through which a user's instructions to operate the multifunction peripheral device are entered, a valid instruction storage unit to store valid instruction information, which defines correspondence between a valid instruction and a valid instruction receiving member, whilst the valid instruction is an operation entered in the multifunction peripheral device in a specific one of the operational modes to trigger the light source to be switched on, and the valid instructive receiving member is one of the plurality of operation receiving members to be operated for the valid instruction to be entered, a judging unit to judge as to whether an operation entered through one of the plurality of operation receiving members is the valid instruction based on the valid instruction information and a current operational mode in which the multifunction peripheral device is operated, and a switching unit to switch the light source on when the judging unit judges that the entered operation is the valid instruction.

According to another aspect of the present invention, a method to control a multifunction peripheral device, having a plurality of operational functions, to be operated in one of a plurality of switchable operational modes, which correspond to the operational functions respectively, is provided. The method includes steps of reading an image formed on an original document by emitting light onto the original document and receiving the light reflected on the original document to generate image data corresponding to the image, receiving a user's instruction to operate the multifunction peripheral device through one of a plurality of operation receiving members, judging as to whether an operation entered through one of the plurality of operation receiving members is a valid instruction based on valid instruction information, which is stored in a valid instruction storage unit and defines correspondence between a valid instruction and a valid instruction receiving member, and a current operational mode in which the multifunction peripheral device is operated, the valid instruction being an operation entered in the multifunction peripheral device in a specific one of the operational modes to trigger the light source to be switched on, the valid instructive receiving member being one of the plurality of operation receiving members to be operated for the valid instruction to be entered, and switching the light source on when the judging unit judges that the entered operation is the valid instruction.

According to still another aspect of the present invention, a computer usable medium including computer readable instructions to control a multifunction peripheral device having a plurality of operational functions, to be operated in one of a plurality of switchable operational modes, which correspond to the operational functions respectively, is provided. The computer readable instructions control the multifunction peripheral device by executing steps of reading an image formed on an original document by emitting light onto the original document and receiving the light reflected on the original document to generate image data corresponding to the image, receiving a user's instruction to operate the multifunction peripheral device through one of a plurality of operation receiving members, judging as to whether an operation entered through one of the plurality of operation receiving members is a valid instruction based on valid instruction information, which is stored in a valid instruction storage unit and defines correspondence between a valid instruction and a valid instruction receiving member, and a current operational mode in which the multifunction peripheral device is operated, the valid instruction being an operation entered in the multifunction peripheral device in a specific one of the operational modes to trigger the light source to be switched on, the valid instructive receiving member being one of the plurality of operation receiving members to be operated for the valid instruction to be entered, and switching the light source on when the judging unit judges that the entered operation is the valid instruction.

According to the above configurations, the valid instructions to trigger the light source to be switched on, among a plurality of instructive operations, are stored in the valid instruction information storage unit in association with the specific operational modes. Therefore, when an invalid instruction which is other than the valid instructions is entered, the light source is not lighted. Meanwhile, the light source is lighted when one of the invalid instructions is entered. Therefore, the light source can be prevented from being wastefully switched on when use of the reader unit is not expected, and can be effectively lighted and stabled in a shorter period of time for the user when the valid instruction, which can induce the reading operation of the reader unit, is entered. In addition, because the light source according to the present invention can be lighted less frequently, a lifetime of the light source can be prolonged effectively.

BRIEF DESCRIPTION OF THE ACCOMPANYING DRAWINGS

FIG. 5 is a list to illustrate valid instruction information according to the embodiment of the present invention.

DETAILED DESCRIPTION

Figure 1:
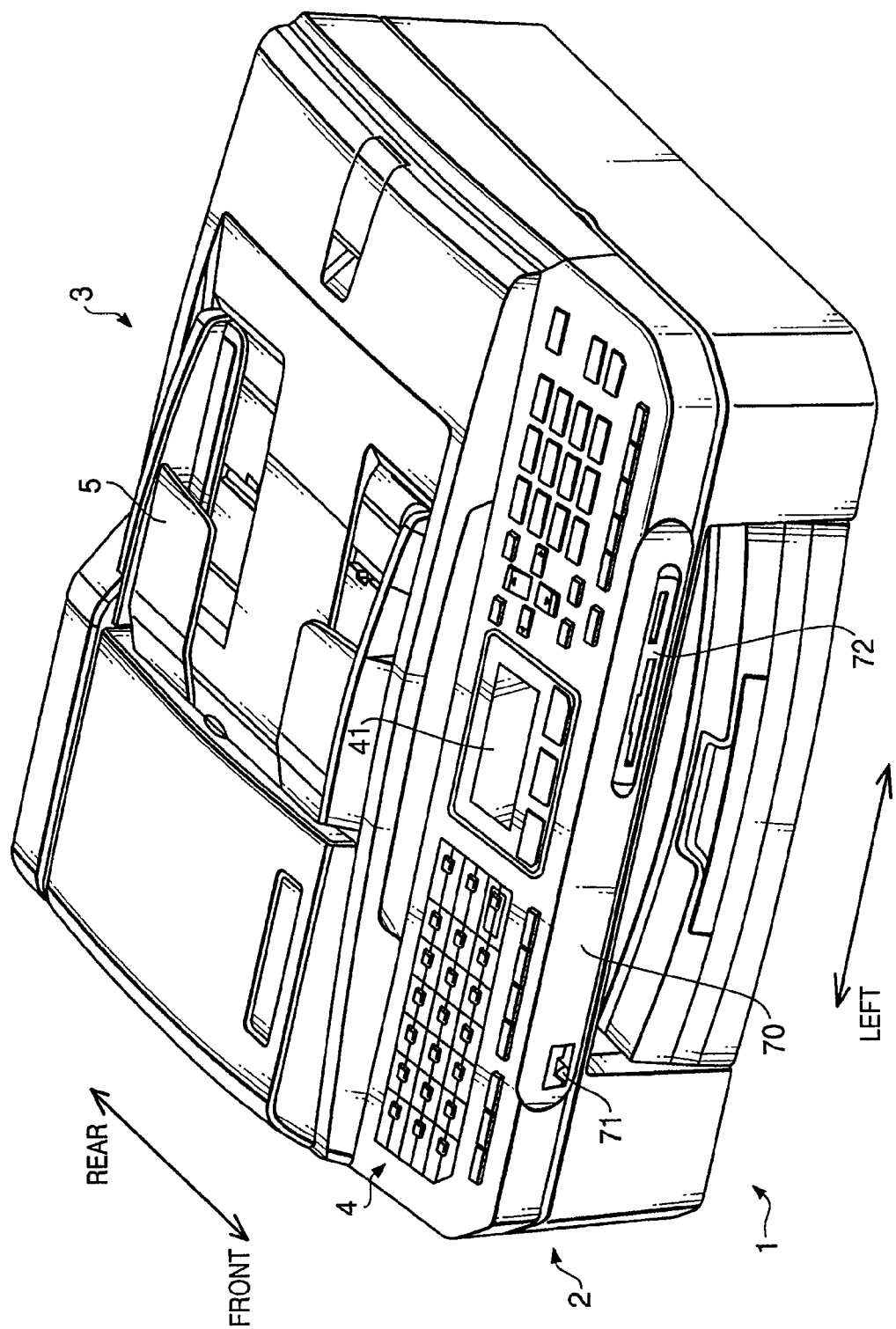
FIG. 1 shows an overall perspective view of an MFP (multifunction peripheral) according to an embodiment of the present invention.

Hereinafter, an embodiment according to an aspect of the present invention will be described with reference to the accompanying drawings. FIG. 1 shows an overall perspective view of an MFP 1 according to an embodiment of the present invention. The MFP 1 includes a printer unit 2 in a lower portion, a scanner unit 3 in an upper portion, and an operation panel 4 on a top front portion, as shown in FIG. 1.

The scanner unit 3 includes a white fluorescent lamp 31 (FIG. 4) as a light source to emit light, which is reflected on an original document placed on a document platen (not shown). The reflection is received by an image capturing device (not shown) and converted into electric signals. Thus, image data representing an original image formed on the original document is generated based on the electric signals. The scanner unit 3 also includes an automatic sheet feeder 5, which feeds a plurality of sheets of original documents one by one onto the document platen so that the light from the light source is reflected on the original documents and the images formed on the original documents can be captured.

The MFP 1 is configured to be operated in one of a plurality of operational modes, which include a copier mode, a facsimile mode, and a scanner mode. In the copier mode, image data is generated through the scanner unit 3 according to an instruction from a user and is output to be printed on a recording sheet through the printer unit 2. In the facsimile mode, the image data is transmitted to an external receiver device (not shown) through a telephone line according to an instruction from the user. In the scanner mode, the image data is transmitted to an external device (not shown) such as a PC (personal computer) through a network or stored in a memory medium such as a memory card attached to the MFP 1 according to an instruction from the user. The MFP 1 can be also operated automatically in a printer mode, upon receipt of image data being transmitted from an external computer, in which the image data received in the MFP 1 is output to be printed on the recording sheet through the printer unit 2. A mode in which the MFP 1 is currently operated will be hereinafter referred to as a current operational mode.

The MFP 1 further includes a connector panel 70 adjacent to the operation panel 4. A USB I/F (interface) 71, into which a USB terminal of a USB cable (not shown) is inserted so that an external device (e.g., a USB memory and a digital camera) connected to the other end of the USB cable and the MFP 1 can be connected for communication, is arranged on a left hand side of the connector panel 70. Further, a slot unit 72 is arranged on a right hand side of the connector panel 70. The slot unit 72 includes a plurality of types of card slots, and each of a plurality of types of memory cards can be inserted into a corresponding card slot so that data can be exchanged between the memory card and the MFP 1. In the present embodiment, the MFP 1 can obtain image data from the memory card when the memory card is inserted in one of the card slots.

The operation panel 4 includes components to provide interface between the MFP 1 and a user so that the user can enter instructions to operate the MFP 1. Various operation keys 40 and an LCD (liquid crystal display) 41, which also serves as a touch panel, are included in the operation panel 4. The user can thus enter instructions for desired operations through the operation panel 4. When an instruction is entered through the operation panel 4, behaviors of the MFP 1 are controlled by a control unit 20 (FIG. 4) according to information corresponding to the instruction.

Figure 2:
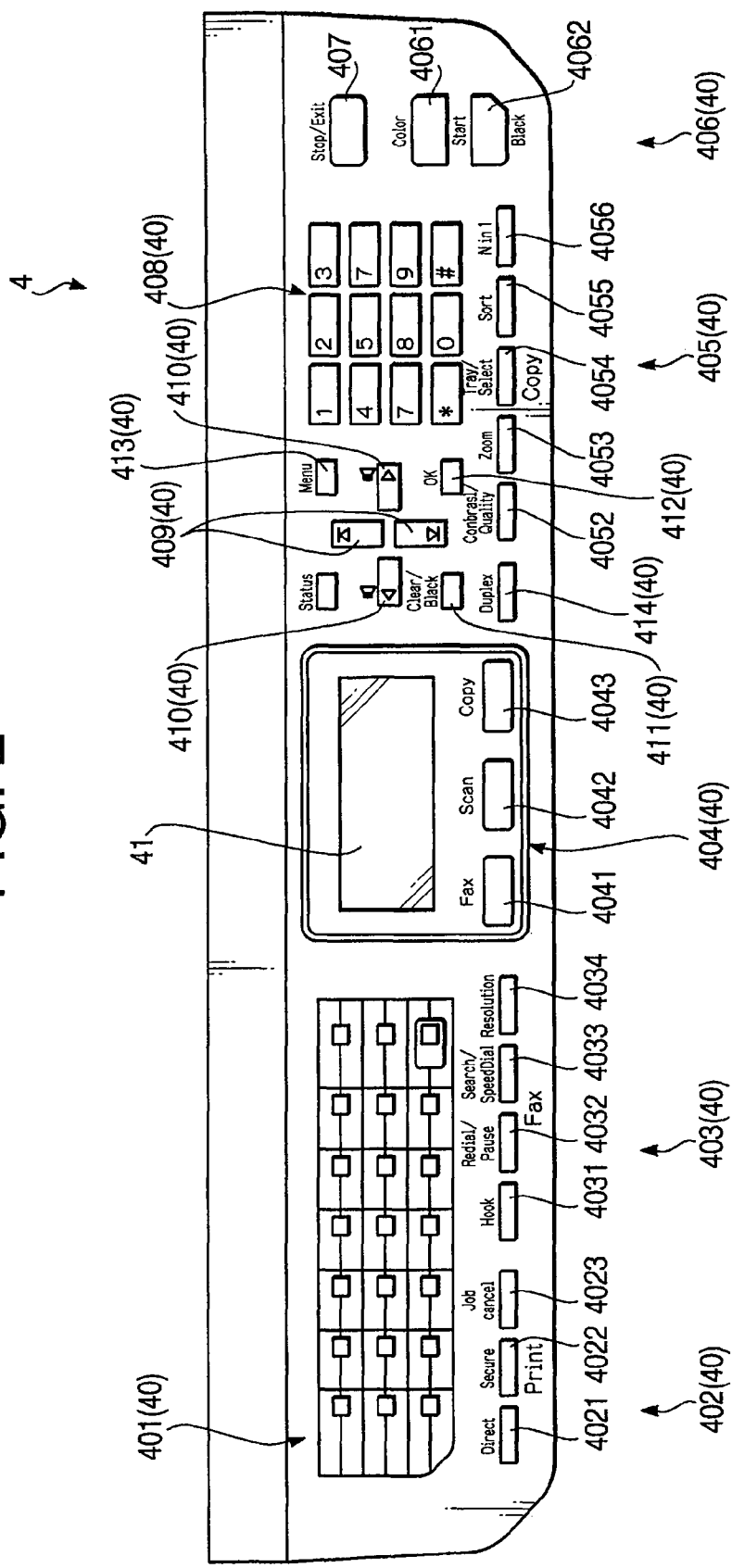
FIG. 2 shows a plane view of an operation panel of the MFP according to the embodiment of the present invention.
Figure 3A:
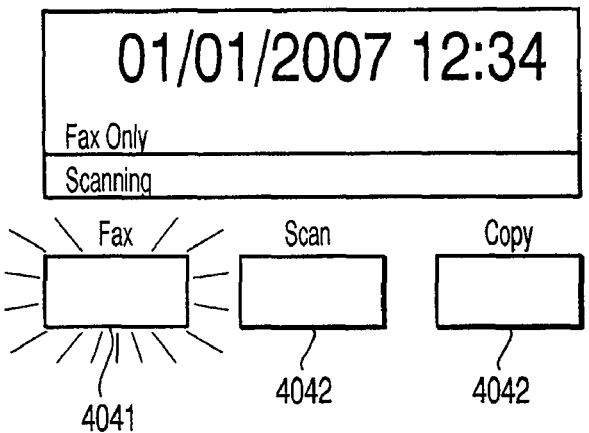
FIGS. 3A-3C illustrate screens to be displayed in the MFP according to the embodiment of the present invention.
Figure 3B:
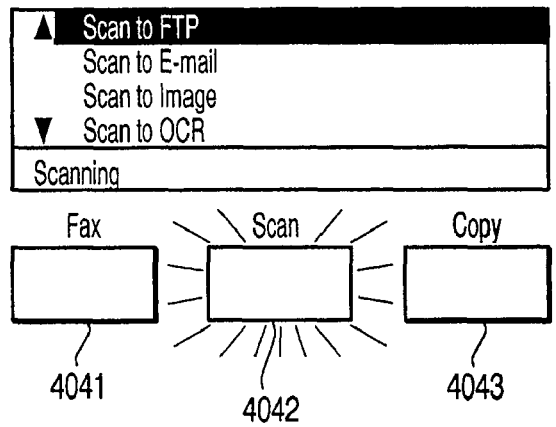
Figure 3C:
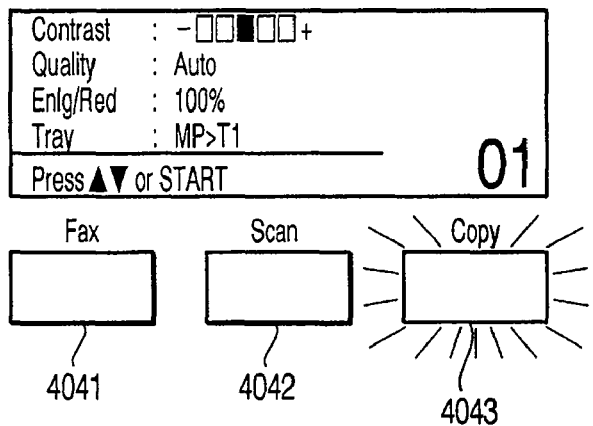

The operation keys 40 will be described with reference to FIGS. 2 and 3A-3C. FIG. 2 shows a plane view of the operation panel 4 of the MFP 1 according to the embodiment of the present invention. FIGS. 3A-3C illustrate screens to be displayed in the LCD 41 of the MFP 1 according to the embodiment of the present invention.

The operation keys 40 includes single-touch dialing keys 401, printer mode keys 402, facsimile mode keys 403, mode switch keys 404, copier setting keys 405, start keys 406, a stop key 407, numerical keys 404, direction keys (up and down) 409, direction keys (right and left) 410, a clear key 411, an OK key 412, a menu key 413, and a duplex read key 414.

The single-touch dialing keys 401 are keys to be operated when an instruction to designate a receiver facsimile machine of the facsimile data is entered in the MFP 1 in the facsimile mode. When the designating instruction is entered and one of the start keys 406 is operated, the facsimile transmission of the facsimile data to the receiver facsimile machine, as designated through one of the single-touch dialing keys 401, is initiated.

FIG. 3A illustrates a facsimile ready screen to be displayed in the LCD 41 of the MFP 1 operated in the facsimile mode and in a standby state. When one of the single-touch dialing keys 401 is operated while the screen as shown in FIG. 3A is displayed, a telephone (facsimile) number representing a receiver facsimile machine and registered in correspondence with the single-touch dialing key 401 is designated as the intended receiver facsimile machine.

Referring back to FIG. 2, the printer mode keys 402 include a direct print key 4021, a secure print key 4022, a job cancel key 4023. The direct print key 4021 is a key to be operated when an instruction to print an image according to image data stored in a removable memory medium, which can be attached to the MFP 1 through the USB I/F 71 and the card slots 72, is entered. The secure print key 4022 is a key to be operated when an instruction to print an image according to image data being protected by a password is entered. The job cancel key 4023 is a key to be operated when a once entered instruction to print an image is canceled.

The facsimile mode keys 403 are keys to be operated when an instruction is entered in the MFP 1 which is operated in the facsimile mode. The facsimile mode keys 403 include a tone key 4031, a redial key 4032, a search/speed dial key 4033, and a resolution key 4034.

The tone key 4031 is a key to be operated when a call is terminated. The redial key 4032 and the search/speed dial key 4033 are keys to be operated when an instruction to designate an intended receiver facsimile machine is entered while the MFP 1 operated in the facsimile mode is in the standby state, as shown in FIG. 3A. When the redial key 4032 and the search/speed dial key 4033 are operated and one of the start keys 406 is operated, the facsimile transmission of the facsimile data to the receiver facsimile machine, as designated through the redial key 4032 and the search/speed dial key 4033, is initiated.

More specifically, when the redial key 4032 is operated, an intended receiver facsimile machine designated in a previous call is again designated to be the intended receiver facsimile machine of the current call. The search/speed dial key 4033 is operated when a registered facsimile number is searched for so that the facsimile number being found is designated to be the facsimile number of the intended receiver facsimile machine. When the search/speed dial key 4033 is operated, facsimile numbers registered in the MFP 1 are displayed in the LCD 41 so that the user can select one of the displayed facsimile numbers by operating the direction keys 409, 410 to shift a cursor (not shown). Optionally, the user may enter a predetermined number corresponding to the facsimile number of the intended receiver facsimile machine to find the desired facsimile number.

The resolution key 4034 is a key to be operated when a resolution for the scanner unit 3 to read the original document is changed. When the resolution key 4034 is operated while the screen as shown in FIG. 3A is displayed, a plurality of optional patterns for the resolution are presented in the LCD 41. When the user selects one of the resolution patterns and one of the start keys 406 is operated, the scanner unit 3 starts the reading operation in the newly set resolution pattern, and facsimile data generated through the reading operation is transmitted.

The mode switch keys 404 are keys to be operated when the operational modes of the MFP 1 are switched from a current operational mode to another. The mode switch keys 404 include a facsimile mode switch key 4041, a scanner mode switch key 4042, and a copier mode switch key 4043. When the facsimile mode switch key 4041 is operated, the current operational mode is switched to the facsimile mode. When the scanner mode switch key 4042 is operated, the current operational mode is switched to the scanner mode. And when the copier mode switch key 4043 is operated, the current operational mode is switched to the copier mode. In the present embodiment, the mode switch keys 404 are formed with an opaque material so that one of the mode switch keys 404 corresponding to the current operational mode can be illuminated (see FIGS. 3A-3C).

The MFP 1 according to the present embodiment is configured to be operated initially in the facsimile mode when the MFP 1 is powered on, and the facsimile ready screen as shown in FIG. 3A is displayed in the LCD 41. When the operational mode is switched to the scanner mode, a scan ready screen 3B is displayed in the LCD 41. When the operational mode is switched to the copier mode, a copy ready screen (FIG. 3C) is displayed in the LCD 41.

FIG. 3C illustrates the copy ready screen to be displayed in the LCD 41 of the MFP 1 according to the embodiment of the present invention. In the copy ready screen, various items (e.g., contrast, image quality, print scale, sheet tray, number of copies) to be configured concerning the copying operation are presented. The items are initially configured in default settings; however, once a new configuration is applied according to the user's input through the copier setting keys 405, the new configuration is displayed in the LCD 41. In the MFP 1 according to the present embodiment, the scanner mode and the copier mode left inactive for a predetermined time period are automatically switched to the facsimile mode.

Referring again to FIG. 2, the copier setting keys 405 are keys to be pressed when the settings concerning the copying operation are changed. The copier setting keys include a contrast/quality key 4052, a zoom key 4053, a tray select key 4054, a sort key 4055, and a multi-page print key 4056.

The contrast/quality key 4052 is a key to be operated when a contrast setting and an image quality setting are changed. When the contrast/quality setting key 4052 is pressed, the user is presented a plurality of configuration options concerning a contrast, a quality, and a density of the copied output and can select desired settings among the options based on various factors of the original image such as sizes, densities, and qualities of photos included in the image.

The zoom key 4053 is a key to be operated when a scale factor for zooming is changed.

The tray select key 4054 is a key to be operated when selection of a sheet tray, in which recording sheets are stored, is changed. The MFP 1 according to the present invention is provided with two sheet trays in different sizes, and the user can select one of the two based on a desired size of the copied output.

The sort key 4055 is a key to be operated when a sorting function of the MFP 1 is used and canceled. The sorting function enables a plurality of sets of copied output to be sorted on the set basis.

The multi-page print key 4056 is a key to be operated when a plurality of pages of original document are incorporated into one page of a recording sheet. The user can select a number of the pages to be incorporated into one page of a recording sheet through the multi-page print key 4056 and, for example, the numerical keys 408.

The start keys 406 include an in-color operation start key 4061 and an in-monochrome operation start key 4062. The in-color operation start key 4061 is a key to be operated when copying, facsimile transmission, and scanning in color are executed. The in-monochrome operation start key 4062 is a key to be operated when copying, facsimile transmission, and scanning in color are executed. The stop key 407 is a key to be operated when the reading operation of the scanner unit 3 needs to be ceased.

When the above configuration items are entered and one of the start keys 406 is operated, the copying operation in accordance with the settings is executed.

The numerical keys 408 are keys to be operated when numerical information is entered in the MFP 1. When the MFP 1 is in the facsimile mode, a number corresponding to the intended receiver facsimile machine can be entered through the numerical keys 408. When the MFP 1 is in the copier mode, a number of copies to be made can be entered.

The direction (up and down) keys 409 are operated when a cursor shown in the LCD 41 is shifted to specify a desired item among the other options. For example, when the MFP 1 is operated in the scanner mode and in the ready state, the scan ready screen as shown in FIG. 3B is displayed in the LCD 41. The user can operate the direction (up and down) keys 409 to shift the cursor to specify a desired format for the image data among the presented format options (e.g., FTP, E-mail, image data, and OCR). When the one of the start keys 406 is operated, the image formed on the original document is read, and image data corresponding to the image is generated in the specified format.

When the MFP 1 is operated in the copier mode and the copier ready screen as shown in FIG. 3C is displayed in the LCD 41, the optional configuration items (i.e., contrast, image quality, zoom, sheet tray) are presented. The user can operate the direction (up and down) keys 409 to shift the cursor to specify a desired configuration to be set. When the configuration is entered and one of the start key 406 is operated, the copying operation is performed according to the entered configuration. It is to be noted that when the configuration items cannot be displayed in one screen in the LCD 41, the items not shown can be displayed in place of the shown items when the direction (down) key 409 is operated.

The direction (right and left) keys 410 are keys to be operated when a volume of sound being output from a speaker (not shown) is adjusted. The clear key 411 is a key to be operated when the numerical information entered through the numerical keys 408 is cleared. The OK key 412 is a key to be operated when the numerical information entered through the numerical keys 408 is confirmed. The menu key 413 is a key to be operated when initial settings of the MFP 1 are viewed and modified. When the menu key 413 is operated, the initial settings of the MFP 1 are obtained from an initial setting storage area 241 (see FIG. 4), which will be described later, and displayed in the LCD 41 for the user to view. The user may then modify the settings to desired new settings.

The duplex read key 414 is a key to be operated when both sides of the original document are read in the scanning operation. When the duplex read key 414 is operated and one of the start key 406 is operated, the scanner unit 3 reads the both sides of the original document. When the duplex read key 414 is not operated, the scanner unit 3 reads solely one predetermined side of the original document.

Figure 4:
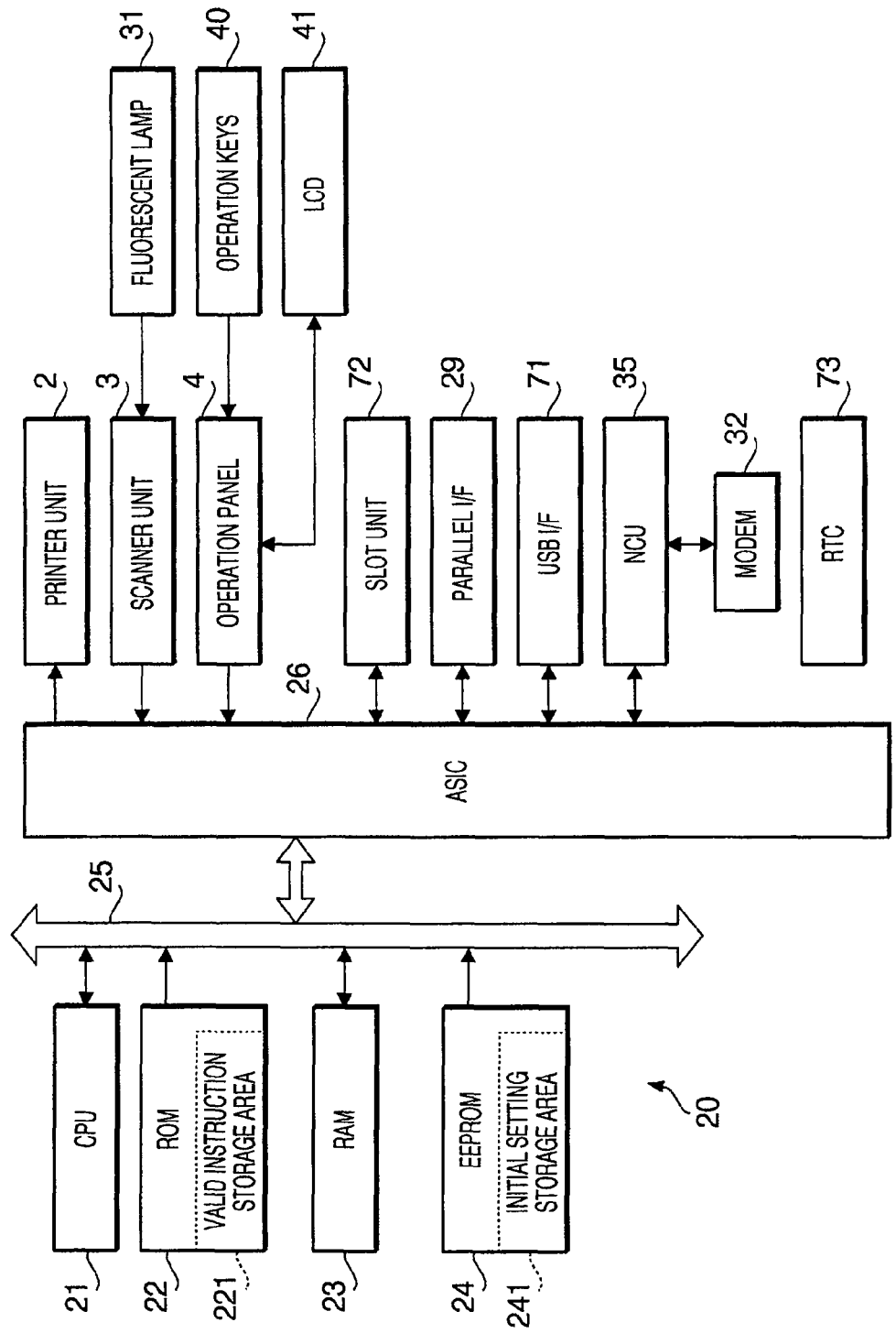
FIG. 4 illustrates an electric configuration of the MFP according to the embodiment of the present invention.

Next, an electrical configuration of the MFP 1 according to the embodiment of the present invention will be described with reference to FIG. 4. FIG. 4 illustrates the electrical configuration of the MFP 1 according to the embodiment of the present invention. The MFP 1 includes a parallel I/F 29, which provides connection between the MFP 1 and an external device such as an external PC (not shown) through a cable, the USB I/F 71, and the slot units 72. With these interfaces, the MFP 1 can be connected with external devices and external storage media such as a PC, a digital camera, and a removable medium. However, the connection between the MFP 1 and the external devices is not necessarily through these interfaces, but may be provided through a network I/F, which is not shown. The MFP 1 is further provided with an RTC (real time clock) 73.

The MFP 1 includes a control unit 20, which is a microcomputer, including a CPU (central processing unit) 21, a ROM (read only memory) 22, a RAM (random access memory) 23, and an EEPROM (electrically erasable and programmable ROM) 24. The control unit 20 is connected to an ASIC (application specific integrated circuit 26) through a bus 25.

The CPU controls the entire behaviors of the MFP 1. The ROM 22 is a memory medium to store various controlling programs to be executed by the CPU 21 and various information to be used in the programs. The ROM 22 includes a valid instruction storage area 221, which will be described later in detail.

The RAM 23 is a rewritable memory medium, which can temporarily store various data to be used in the programs and serve as a work area for the programs. The EEPROM 24 is a rewritable nonvolatile memory medium, which includes an initial setting storage area 241. Information concerning initial settings of the MFP 1, such as a color setting (color or monochrome), a resolution, and a file format of the scanning operation, is stored in the initial setting storage area 241. When the menu key 413 (FIG. 2) is operated, the initial settings as stored in the initial setting storage area 241 are displayed in the LCD 41, and the user can modify the settings through the operation keys 40.

The ASIC 26 is connected with the control unit 20 through the bus 25. The ASIC 26 is further connected with the components of the MFP 1, which include the printer unit 2, the scanner unit 3, an operation panel 4, the LCD 41, the slot unit 72, the parallel I/F 29, the USB I/F 71, an NCU (network control unit) 35, and the RTC 73.

The operation panel 4 includes the various operation keys 40 so that predetermined code signals corresponding to the operations (e.g., pressing) being given to the operation keys 40 are conveyed to the ASIC 26 and eventually to the CPU 26. The LCD 41, also included in the operation panel 4, is configured to display screens according to the current operational mode based on the instructions from the CPU 21.

The NCU 35 is a unit to control facsimile communication to be performed with external devices through a telephone network and is connected with a modem 32.

The RTC 73 is a time-keeping IC (integrated circuit). The timing obtained by the CPU 21 from the RTC 73 is utilized in the operations in the MFP 1.

Next, valid instruction information stored in the valid instruction storage area 221 will be described with reference to FIG. 5. FIG. 5 is a list to illustrate the valid instruction information according to the embodiment of the present invention.

A valid instruction according to the present embodiment refers to an operation entered in the MFP 1 through one of the operation keys 40 to trigger the fluorescent lamp 31 to be switched on. The valid instruction information refers to information which indicates correspondence between a valid instructive key, which is the operation key 40 to be operated for the valid instruction to be entered, and the valid instruction. When one of the operation keys 40 being the valid instructive key, corresponding to the valid instruction information, is operated, the operation triggers the fluorescent lamp 31 in the scanner unit 3 to be turned on. The valid instruction information is stored in the valid instruction information storage area 221 in the ROM 21 in association with at least one of the operational modes.

In the present embodiment, in the MFP 1 in the facsimile mode, the numerical keys 408, the single-touch dialing keys 401, the search/speed dial keys 4033, the redial key 4032, the resolution key 4034, and the duplex read key 414 are included to be the valid instructive keys (see FIG. 5). Therefore, operations to these keys are considered to be the valid instructions. That is, when the valid instructive keys are operated while the MFP 1 is in the facsimile mode, it can be expected that one of the start keys 406 will be operated shortly and the scanning operation will be instructed.

In addition, the scanner mode switch key 4042 and the copier mode switch key 4043 are included as the valid instructive keys. When these valid instructive keys are operated while the MFP 1 is in the facsimile mode, it can be expected that the current operational mode is switched to the scanner mode and the copier mode respectively and the scanner unit 3 will be used.

Therefore, the fluorescent lamp 31 can be switched on for warm-up when an instruction to one of the valid instructive keys is entered so that the scanning operation can be initiated in a shorter waiting period for the user.

When an operation to the printer mode key 402, the copier mode key 405, and the direction (up and down) keys 409, which are not the valid instructive keys, is entered, the fluorescent lamp 31 is not turned on. Thus, the fluorescent lamp 31 can be prevented from being wastefully switched on when use of the scanner unit 3 is not expected.

Meanwhile, as shown in FIG. 5, the valid instruction information for the MFP 1 in the scanner mode includes information concerning the direction (up and down) keys 409 and the copier mode switch key 4043. That is, the direction (up and down) keys 409 and the copier mode switch key 4043 are the valid instructive keys in the scanner mode.

When these valid instructive keys are operated while the MFP 1 is in the scanner mode, it can be expected that one of the start keys 406 will be operated shortly and the scanning operation will be instructed.

In addition, when an operation to the copier mode switch key 4043 is entered in the MFP 1 in the scanner mode, it can be also expected that the scanner 3 will be used.

Therefore, the fluorescent lamp 31 can be switched on for warm-up when an instruction to one of the valid instructive keys is entered so that the scanning operation can be initiated in a shorter waiting period for the user.

When an operation to the operation keys 40, which are not the valid instructive keys, is entered, the fluorescent lamp 31 is not turned on. Thus, the fluorescent lamp 31 can be prevented from being wastefully switched on when use of the scanner unit 3 is not expected.

Meanwhile, as shown in FIG. 5, the valid instruction information for the MFP 1 in the copier mode includes information concerning the direction (up and down) keys 409, the copier mode key 405, the numerical keys 408, the start keys 406, and the scanner mode switch key 4042. That is, the direction (up and down) keys 409, the copier mode key 405, the numerical keys 408, the start keys 406, and the scanner mode switch key 4042 are the valid instructive keys in the copier mode.

When these valid instructive keys are operated while the MFP 1 is in the copier mode, it can be expected that one of the start keys 406 will be operated shortly and the scanning operation will be instructed.

In addition, when an operation to the scanner mode switch key 40423 is entered in the MFP 1 in the copier mode, it can be also expected that the scanner 3 will be used.

Therefore, the fluorescent lamp 31 can be switched on for warm-up when an instruction to one of the valid instructive keys is entered so that the scanning operation can be initiated in a shorter waiting period for the user.

When an operation to the operation keys 40, which are not the valid instructive keys, is entered, the fluorescent lamp 31 is not turned on. Thus, the fluorescent lamp 31 can be prevented from being wastefully switched on when use of the scanner unit 3 is not expected.

None of the printer mode key 402, the clear key 411, the OK key 412, and the menu key 413 is included as the valid instructive key in any operation mode. It is to be noted that the printer mode key 402 is a key to be operated for entering the printer mode, in which no scanning operation is executed. The clear key 411 and the OK key 412 are to be operated successively to the numerical keys 408. Further, the menu key 413 is to be operated when the initial settings stored in the initial setting storage area 241 are modified. Therefore, it may not be necessarily expected that the scanner unit 3 is used for the scanning operation shortly. Thus, none of the printer mode key 402, the clear key 411, the OK key 412, and the menu key 413 is included as the valid instructive key so that the fluorescent lamp 31 can be prevented from being turned on wastefully.

Figure 6:
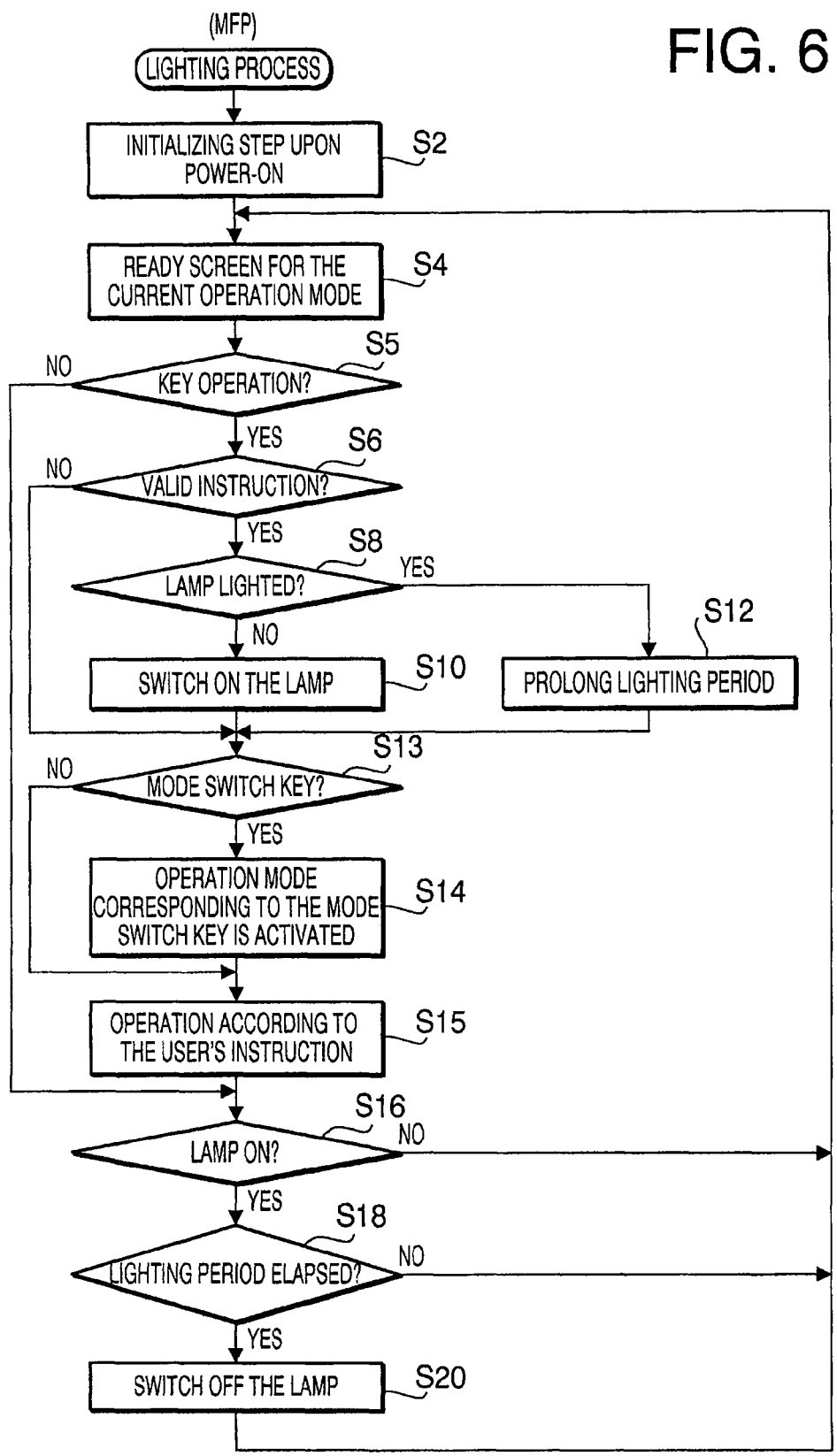
FIG. 6 is a flowchart to illustrate a lighting process to be performed in the MFP according to the embodiment of the present invention.

Next, a lighting process for the fluorescent lamp 31 of the scanner unit 3 in the MFP 1 according to the embodiment of the present invention will be described with reference to FIG. 6. FIG. 6 is a flowchart to illustrate the lighting process to be performed in the MFP 1 according to the embodiment of the present invention. The process is initiated when the MFP 1 is powered on.

As the MFP 1 is powered on, in S2, the MFP 1 is initialized. Thereafter, in S4, a ready screen corresponding to the current operational mode is displayed in the LCD 41. The operational mode for the MFP 1 upon power-on is the facsimile mode; therefore, the facsimile mode ready screen (FIG. 3A) is displayed. Thereafter, the ready screen to be displayed among the facsimile mode ready screen, the scanner mode ready screen (FIG. 3B), and the copier mode ready screen (FIG. 3C) depends on the operational mode in which the MFP 1 is operated currently.

In S5, it is determined as to whether the user operated any of the operation keys 40. When an operation is provided (S5: YES), in S6, it is determined as to whether the operation provided is the valid instruction based on the current operational mode and the valid instruction information. Specifically, it is determined as to whether information concerning the operation key which has been operated in S5 is included in the valid instruction information, which is stored in the valid instruction storage area 221.

If the operation to the operation key 40 is the valid instruction (S6: YES), in S8, it is determined as to whether the fluorescent lamp 31 is lighted. If the fluorescent lamp 31 is not lighted (S8: NO), in S10, the fluorescent lamp 31 is turned on. That is, power is supplied to the scanner unit 3. Optionally, after the fluorescent lamp 31 is turned on, a step to accelerate the warming-up and/or a step to judge as to whether the light amount is stabled can be added. With these steps, the scanning operation can be started speedily when an instruction to start the scanning operation is given.

In S8, if the fluorescent lamp 31 is lighted (S8: YES), in S12, a lighting period for the fluorescent lamp 31 is extended. In the present embodiment, the lighting period is a longer one of 30 minutes from the switching on of the fluorescent lamp 31 and 10 minutes from completion of a previous scanning operation. Therefore, the fluorescent lamp 31 can be automatically turned off after 30 minutes from the switching on of the fluorescent lamp 31 or 10 minutes from completion of a previous scanning operation; however, if the valid instruction is given within the lighting period, the light is maintained on for a predetermined additional period of time (e.g., 5 minutes). With this configuration, when the instruction to start the scanning operation is entered, the light of the fluorescent lamp 31 is maintained; therefore, the scanning operation can be started immediately.

In S6, the entered operation is not the valid instruction (S6: NO), the process proceeds to S13. In this step, if the fluorescent lamp 31 is powered off, the powered-off state is maintained. If the fluorescent lamp 31 is lighted, the lighting period is not extended.

In S13, it is determined as to whether the operation key 40 having been operated in S5 is one of the mode switch keys 404. If the operation key 40 is one of the mode switch keys 404 (S13: YES), the operational mode corresponding to the operated mode switch keys 404 (i.e., one of the facsimile mode switch key 4041, the scanner mode switch key 4042, and the copier mode switch key 4043) is activated (S14). If the operation key 40 is not any of the mode switch keys 404 (S13: NO), the process proceeds to S15.

In S15, an operation according to the user's instruction is performed. In S16, it is determined as to whether the fluorescent lamp 31 is lighted. If the fluorescent lamp is lighted (S16: YES), in S18, it is determined as to whether the lighting period has elapsed with reference to the RTC 73. If the lighting period has elapsed, in S20, the fluorescent lamp 31 is switched off. Specifically, the power supply to the scanner unit 3 is ceased.

In S16, if it is determined that the fluorescent lamp is not lighted (S16: NO), and in S18, if it is determined as to whether the lighting period has not elapsed (S18: NO), the process returns to S4 and repeats the following steps.

It is to be noted in S5, if no operation to the operation keys 40 is given (S5: NO), the process proceeds to S16. In S16, if the fluorescent lamp 31 is lighted (S16: YES), when the lighting period elapses (S18: YES), in S20, the fluorescent lamp 31 is switched off.

According to the MFP 1 configured as above, the information concerning each valid instruction to trigger the fluorescent lamp 31 to be lighted is stored in association with the corresponding operational mode. Therefore, the fluorescent lamp 31 can be turned on only when the valid instruction is entered. Meanwhile, the fluorescent lamp 31 can be maintained unlighted when an invalid instruction other than the valid instruction is entered. Thus, the fluorescent lamp 31 can be prevented from being wastefully switched on when use of the scanner unit 3 is not expected, and can be effectively lighted and stabled in a shorter period of time for the user when the valid instruction, which can induce the reading operation of the scanner unit 3, is entered. In addition, because the fluorescent lamp 31 according to the present embodiment can be lighted less frequently, a lifetime of the fluorescent lamp 31 can be prolonged effectively while some light sources including a fluorescent lamp can be deteriorated faster by switching on and off frequently.

According to the MFP 1 in the above configuration, the lighting period is effectively extended when the fluorescent lamp 31 is already lighted and it is determined that the entered instruction is the valid instruction. Therefore, the reading operation by the scanner unit 3 can be started in a shorter period of time for the user compared to a configuration in which the reading operation is started after the reading operation is confirmed.

According to the MFP 1 in the above configuration, the fluorescent lamp 31 is lighted when an operation concerning the functional settings of the scanner unit 3 or the output operation of the image data, which can trigger the reading operation, is entered. Therefore, the reading operation by the scanner unit 3 can be started in a shorter period of time for the user compared to a configuration in which the reading operation is started after the reading operation is confirmed.

According to the MFP 1 in the above configuration, the fluorescent lamp 31 is lighted when an operation to switch the operational modes, which can trigger the reading operation, is entered. Therefore, the reading operation by the scanner unit 3 can be started in a shorter period of time for the user compared to a configuration in which the reading operation is started after the reading operation is confirmed.

Although an example of carrying out the invention has been described, those skilled in the art will appreciate that there are numerous variations and permutations of the multifunction peripheral device that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the instructions including the valid instructions can be not necessarily entered through the operation keys 40, but may be entered through the other user interface units such as the touch panel and external devices being connected to the MFP 1 (e.g., a mobile phone and a digital camera).

In the above embodiment, each function of the MFP 1 is assigned to one of the operation keys 40; however, the operation keys may not necessarily be corresponded to the functions one-by-one. For example, a multifunctional key can be provided, and when the multifunctional key is operated, available configuration items can be presented to the user in the LCD 41. In this configuration, the operation to the multifunctional key can be the valid instruction, and information concerning the multifunctional key can be stored in the valid instruction storage area 221.

Further, the valid instruction information may not necessarily be the information concerning the operation key to be operated for the valid instruction as long as the user's operation to the MFP 1 can be determined to be the valid instruction. For example, the valid instruction storage area 221 may store information concerning an invalid instruction, which does not trigger the reading operation.

For another example, the light source of the scanner unit 3 may not be necessarily the fluorescent lamp, but may be a different type of light such as a halogen lamp. The present invention can be specifically effective to a scanner unit having a light source which requires considerable time for warming-up from power-on.

In the above embodiment, the scanner unit 3 is a flatbed type scanner having the automatic sheet feeder 5; however, the present invention can be applied to an MFP having another type of scanners such as a handy-type scanner.

In the above embodiment, switching on and off the fluorescent lamp 31 is controlled by supplying and shutting down power to the entire scanner unit 3; however, the switching on and off the light source can be independently controlled regardless of the power state of the scanner unit 3.

What is claimed is:

1. A multifunction peripheral device having a plurality of operational functions and configured to be operated in one of a plurality of switchable operational modes, which correspond to the operational functions respectively, comprising:
   a reader unit including a light source configured to emit light onto an original document and a light receiving element configured to receive the light reflected on the original document to generate image data which corresponds to an image formed on the original document;
   a plurality of operation receiving members, through which a user's instructions to operate the multifunction peripheral device are received;
   a valid instruction storage unit configured to store valid instruction information, which defines correspondence between valid instructions and valid instruction receiving members, each of the valid instructions being an operation received by the multifunction peripheral device in a specific one of the operational modes to trigger the light source to be switched on, each of the valid instruction receiving members being one of the plurality of operation receiving members to be operated for one of the valid instructions to be received;
   a processing unit; and
   memory having machine readable instructions stored thereon that, when executed by the processing unit, cause the multifunctional peripheral device to operate as
      a judging unit to determine whether an operation received through one of the plurality of operation receiving members is one of the valid instructions based on the valid instruction information and a current operational mode in which the multifunction peripheral device is operated; and
      a switching unit to switch the light source on when the judging unit determines that the received operation is one of the valid instructions,
   wherein the operational modes include a facsimile mode, in which the image data generated by the reader unit is able to be output to a receiver machine through a telephone line, a scanner mode, in which the image data is able to be one of stored in a memory medium and output to an external device, and a copier mode, in which the image data is able to be output to be printed on a recording medium,
   wherein the operational modes are switched from one to another by a predetermined one of the plurality of operation receiving members, and
   wherein an instruction to configure the reader unit to read the image on the original document and an instruction to configure output settings of the image data are defined to be ones of the valid instructions on an operational mode basis.

2. The multifunction peripheral device according to claim 1, wherein the memory further has readable instructions stored thereon that, when executed by the processing unit, cause the multifunctional peripheral device to operate as:
   a lighting period extension unit which extends a predetermined lighting period, in which the light source is maintained lighted, when the received operation is determined to be one of the valid instructions.

3. The multifunction peripheral device according to claim 1, wherein an operation received by the predetermined one of the plurality of operation receiving members to switch the operational modes is defined to be one of the valid instructions.

4. A multifunction peripheral device having a plurality of operational functions and configured to be operated in one of a plurality of switchable operational modes, which correspond to the operational functions respectively, comprising:
   a reader unit including a light source configured to emit light onto an original document and a light receiving element configured to receive the light reflected on the original document to generate image data which corresponds to an image formed on the original document;
   a plurality of operation receiving members, through which a user's instructions to operate the multifunction peripheral device are received;
   a valid instruction storage unit configured to store valid instruction information, which defines correspondence between a valid instruction and a valid instruction receiving member, the valid instruction being an operation received by the multifunction peripheral device in a specific one of the operational modes to trigger the light source to be switched on, the valid instruction receiving member being one of the plurality of operation receiving members to be operated for the valid instruction to be received;
   a processing unit; and
   memory having machine readable instructions stored thereon that, when executed by the processing unit, cause the multifunctional peripheral device to operate as
      a judging unit to determine whether an operation received through one of the plurality of operation receiving members is the valid instruction based on the valid instruction information and a current operational mode in which the multifunction peripheral device is operated; and
      a switching unit to switch the light source on when the judging unit determines that the received operation is the valid instruction,
   wherein the operational modes include a facsimile mode, in which the image data generated by the reader unit is able to be output to a receiver machine through a telephone line, a scanner mode, in which the image data is able to be one of stored in a memory medium and output to an external device, and a copier mode, in which the image data is able to be output to be printed on a recording medium,
   wherein the operational modes are switched from one to another by a predetermined one of the plurality of operation receiving members, and
   wherein an instruction received by the multifunction peripheral device operated in the facsimile mode to designate the receiver machine is defined to be the valid instruction.

5. The multifunction peripheral device according to claim 4, wherein the memory further has readable instructions stored thereon that, when executed by the processing unit, cause the multifunctional peripheral device to operate as:
   a lighting period extension unit which extends a predetermined lighting period, in which the light source is maintained lighted, when the received operation is determined to be the valid instruction.

6. The multifunction peripheral device according to claim 4, wherein an operation received by the predetermined one of the plurality of operation receiving members to switch the operational modes is defined to be the valid instruction.

7. A method to control a multifunction peripheral device, having a plurality of operational functions, to be operated in one of a plurality of switchable operational modes, which correspond to the operational functions respectively, comprising:
  reading an image formed on an original document by emitting light onto the original document and receiving the light reflected on the original document to generate image data corresponding to the image;
  receiving a user's instruction to operate the multifunction peripheral device through one of a plurality of operation receiving members;
  determining whether an operation received through one of the plurality of operation receiving members is one of a plurality of valid instructions based on valid instruction information, which is stored in a valid instruction storage unit and defines correspondence between valid instructions and valid instruction receiving members, and a current operational mode in which the multifunction peripheral device is operated, each of the valid instructions being an operation received by the multifunction peripheral device in a specific one of the operational modes to trigger the light source to be switched on, each of the valid instruction receiving members being one of the plurality of operation receiving members to be operated for one of the valid instructions to be received; and
  switching the light source on when the judging unit determines that the received operation is one of the valid instructions,
  wherein the operational modes of the multifunction peripheral device include a facsimile mode, in which the image data generated by the reading step is able to be output to a receiver machine through a telephone line, a scanner mode, in which the image data is able to be one of stored in a memory medium and output to an external device, and a copier mode, in which the image data is able to be output to be printed on a recording medium,
  wherein the operational modes are switched from one to another by receiving the user's instruction through a predetermined one of the plurality of operation receiving members, and
  wherein an instruction to configure the reader unit to read the image on the original document and an instruction to configure output settings of the image data are defined to be ones of the valid instructions on an operational mode basis.

8. The method according to claim 7, further comprising: extending a predetermined lighting period, in which the light source is maintained lighted, when the received operation is determined to be one of the valid instructions.

9. The method according to claim 7, wherein an instruction received by the multifunction peripheral device operated in the facsimile mode to designate the receiver machine is defined to be one of the valid instructions.

10. The method according to claim 7, wherein an operation received by the predetermined one of the plurality of operation receiving members to switch the operational modes is defined to be one of the valid instructions.

11. A non-transitory computer readable medium comprising computer readable instructions that, when executed by a processing unit, control a multifunction peripheral device, having a plurality of operational functions, to be operated in one of a plurality of switchable operational modes, which correspond to the operational functions respectively, by performing steps of:
  reading an image formed on an original document by emitting light onto the original document and receiving the light reflected on the original document to generate image data corresponding to the image;
  receiving a user's instruction to operate the multifunction peripheral device through one of a plurality of operation receiving members;
  determining whether an operation received through one of the plurality of operation receiving members is a valid instruction based on valid instruction information, which is stored in a valid instruction storage unit and defines correspondence between a valid instruction and a valid instruction receiving member, and a current operational mode in which the multifunction peripheral device is operated, the valid instruction being an operation received by the multifunction peripheral device in a specific one of the operational modes to trigger the light source to be switched on, the valid instruction receiving member being one of the plurality of operation receiving members to be operated for the valid instruction to be received; and
  switching the light source on when the judging unit determines that the received operation is the valid instruction,
  wherein the operational modes of the multifunction peripheral device include a facsimile mode, in which the image data generated by the reading step is able to be output to a receiver machine through a telephone line, a scanner mode, in which the image data is able to be one of stored in a memory medium and output to an external device, and a copier mode, in which the image data is able to be output to be printed on a recording medium,
  wherein the operational modes are switched from one to another by receiving the user's instruction through a predetermined one of the plurality of operation receiving members, and
  wherein an instruction received by the multifunction peripheral device operated in the facsimile mode to designate the receiver machine is defined to be the valid instruction.

12. The non-transitory computer readable medium according to claim 11, further comprising computer readable instructions that, when executed by the processing unit, perform a step of:
  extending a predetermined lighting period, in which the light source is maintained lighted, when the received operation is determined to be the valid instruction.

13. The non-transitory computer readable medium according to claim 11, wherein an instruction to configure the reader unit to read the image on the original document and an instruction to configure output settings of the image data are defined to be valid instructions on an operational mode basis.

14. The non-transitory computer readable medium according to claim 13, wherein an operation received by the predetermined one of the plurality of operation receiving members to switch the operational modes is defined to be one of the valid instructions.

* * * * *